United States Patent
Parker-Swift et al.

(10) Patent No.: US 12,413,173 B2
(45) Date of Patent: Sep. 9, 2025

(54) COMMERCIAL ROOF

(71) Applicant: Solivus Limited, London (GB)

(72) Inventors: Joanna Parker-Swift, London (GB); James Baker, London (GB); Ciaran Cotter, London (GB)

(73) Assignee: Solivus Limited, London (GB)

( * ) Notice: Subject to any disclaimer, the term of this patent is extended or adjusted under 35 U.S.C. 154(b) by 223 days.

(21) Appl. No.: 17/767,797

(22) PCT Filed: Oct. 9, 2020

(86) PCT No.: PCT/EP2020/078491
§ 371 (c)(1),
(2) Date: Apr. 8, 2022

(87) PCT Pub. No.: WO2021/069710
PCT Pub. Date: Apr. 15, 2021

(65) Prior Publication Data
US 2024/0088823 A1    Mar. 14, 2024

(30) Foreign Application Priority Data

Oct. 11, 2019   (GB) ...................... 1914715

(51) Int. Cl.
*H02S 20/23*      (2014.01)
*E04D 3/30*       (2006.01)
(Continued)

(52) U.S. Cl.
CPC ............... *H02S 20/23* (2014.12); *E04D 3/30* (2013.01); *H02S 20/25* (2014.12); *H02S 20/26* (2014.12); *H02S 40/32* (2014.12); *H02S 40/34* (2014.12)

(58) Field of Classification Search
CPC . E04D 3/30; H02S 20/23; H02S 20/25; H02S 20/26
See application file for complete search history.

(56) References Cited

U.S. PATENT DOCUMENTS 6,291,761 B1   9/2001   Takada et al.
8,978,322 B2 * 3/2015   Elliott ..................... F24S 25/15
                                                          52/173.3
(Continued)

FOREIGN PATENT DOCUMENTS

CN       203457102 U       2/2014
CN       108599684 A  *    9/2018   ............... E04D 1/12
(Continued)

OTHER PUBLICATIONS

European Combined Search and Examination Report in related application GB1914715.6 dated Feb. 20, 2020.
(Continued)

*Primary Examiner* — Jessie T Fonseca
(74) *Attorney, Agent, or Firm* — Patterson + Sheridan, LLP

(57) ABSTRACT

A roof panel comprising a rigid sheet (1) of material for forming a structural roof. The sheet is formed with a plurality of ridges (2), and a flexible solar material (6) attached along at least one of the ridges. The maximum height of at least one ridge (2) above the lowermost plane of the sheet is greater than 50 cm. A method of forming the roof panel comprises forming through holes (11) in the metal sheet, adhering a flexible solar material (6) along at least one of the ridges, and miming electrical connections (7) to the solar panel through the holes to the underside of the ridges (2).

12 Claims, 5 Drawing Sheets

(51) Int. Cl.
*H02S 20/25* (2014.01)
*H02S 20/26* (2014.01)
*H02S 40/32* (2014.01)
*H02S 40/34* (2014.01)

(56) References Cited

U.S. PATENT DOCUMENTS

| | | | | |
|---|---|---|---|---|
| 10,079,569 | B1* | 9/2018 | Schneider | F24S 25/00 |
| 2007/0295389 | A1 | 12/2007 | Capps et al. | |
| 2008/0000512 | A1* | 1/2008 | Flaherty | E04D 1/30 |
| | | | | 136/244 |
| 2009/0205270 | A1* | 8/2009 | Shaw | H02S 20/25 |
| | | | | 52/173.3 |
| 2012/0006397 | A1* | 1/2012 | Gou | H01L 31/202 |
| | | | | 257/E31.032 |
| 2013/0061913 | A1 | 3/2013 | Willham et al. | |
| 2013/0160823 | A1* | 6/2013 | Khouri | H02S 20/00 |
| | | | | 136/251 |
| 2014/0102519 | A1 | 4/2014 | Rodrigues et al. | |
| 2017/0155359 | A1 | 6/2017 | Vignal et al. | |
| 2019/0245478 | A1* | 8/2019 | de Vries | H01L 31/048 |
| 2020/0007075 | A1* | 1/2020 | Somogyi | H02S 40/34 |

FOREIGN PATENT DOCUMENTS

| | | | | |
|---|---|---|---|---|
| CN | 109383115 | A | | 2/2019 |
| EP | 3553944 | A1* | 10/2019 | ............... E04D 1/02 |
| IT | RM20080550 | A1 | | 4/2010 |
| JP | H10306517 | A | | 11/1998 |
| KR | 101911689 | B1* | 10/2018 | ............... E04D 1/02 |
| KR | 101936387 | B1* | 1/2019 | |
| KR | 20190093981 | A* | 8/2019 | ....... H01L 31/02002 |
| WO | 2003/054967 | A1 | | 7/2003 |
| WO | WO-2005091379 | A2* | 9/2005 | ....... H01L 31/03926 |
| WO | WO-2016001738 | A1* | 1/2016 | ....... H01L 31/02002 |
| WO | WO-2018157656 | A1* | 9/2018 | ........... H01L 31/048 |

OTHER PUBLICATIONS

International Search Report and Written Opinion in related application PCT/EP2020/078491 dated Nov. 19, 2020.

* cited by examiner

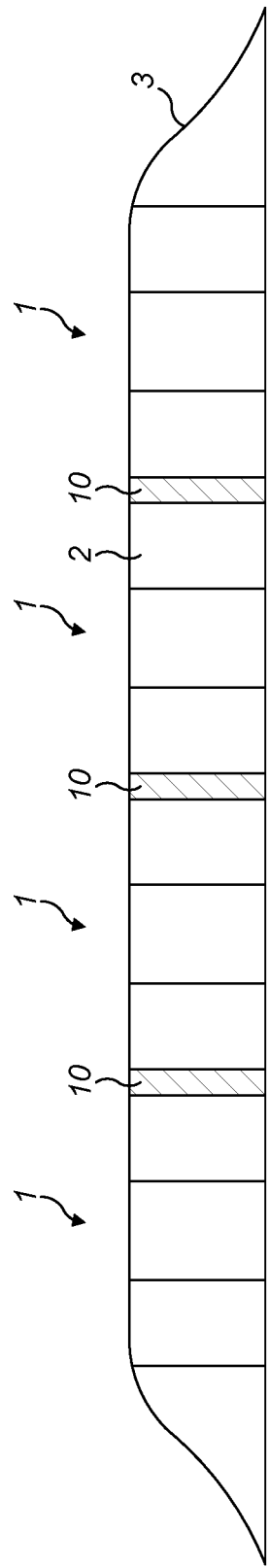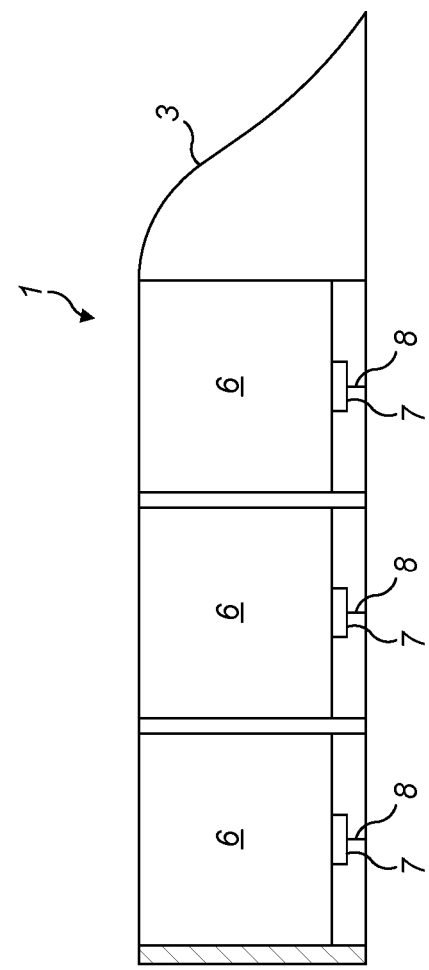

COMMERCIAL ROOF

The present invention relates to a roof panel.

In particular, the present invention relates to a roof panel which can collect solar energy.

Solar panels are often mounted to roofs of buildings as, given the large surface area that they require, this is a convenient place to put them. By mounting them to the roof of the building, the power can be supplied directly into the building thereby allowing the building to directly benefit from the generated power.

In general, the solar panels are rigid flat structures in which the photovoltaic cells are supported on a rigid base. This is attached to a pre-existing roof and will either be positioned on the side of a pitched roof which receives greatest amount of incident sunlight, or, in the case of a flat roof, it will be mounted on an angled support again to increase the amount of incident sunlight. These solar panels are relatively expensive and require a separate installation process, leading to increased installation costs.

US2017/0155359 discloses a roof panel formed from a metal sheet. Photovoltaic material is either provided as a flexible sheet or is deposited directly onto the panel.

The present invention relates to developments of this basic idea. In particular, it is concerned with making panels on a larger sale, at low cost, and/or in a form in which a complete solar system can be integrated into the roof panel in factory setting so that the panels can be placed on the roof to give a fully functioning solar system with minimal additional work required beyond that required of a conventional roof panel installation.

According to a first aspect of the present invention, there is provided a roof panel according to claim 1.

The panels of the invention incorporate much higher ridges than the flat ridges of US2017/0155359. This makes them suitable for large buildings such as warehouses and the like. By having higher ridges on a large panel, we have found that the solar material can be positioned on these larger ridges in such a way as to be able to generate electricity more evenly throughout the day. The larger ridges allow more scope for the solar material to be positioned across the ridges at a range of orientations to even out the generating capacity throughout the day. This is a departure from conventional arrangements where the emphasis is on maximising the daily power generation.

The roof panel material effectively provides the structural rigidity for the flexible solar material. In the prior art rigid solar panels, the panels themselves provide the rigidity to the photovoltaic cells which significantly increases the cost and weight of the combination of the roof panels and solar panels as compared to the present invention.

This allows the emphasis to be on evening out the generating capacity during the day as the panel can afford to have a the solar material, for example, on one side of a ridge such that it is generating at sub-optimal capacity for most of the day, but then generating at optimal capacity during the morning or evening when other strips are less efficient because of their positioning.

Because the solar material is flexible, it can conform to the shape of the ridge allowing the roof panels to be stacked and handled in exactly the same manner that conventional ridged roof panels are currently.

In particular, the installation process requires only that the roof panel is put in place in the conventional manner. As the solar material is already in place, it is installed together with the roof panel. It is then simply a matter of making up the electrical connection to the solar material.

The flexible solar material may be attached to the panel for example by fasteners. However, preferably, the flexible solar material is bonded to the roof panel using an adhesive.

The ridges which are formed on the roof panel may be formed by attaching separate ridge members to a flat panel of material. However, preferably, the sheet of material is corrugated such that the ridges are an integral part of the panel.

The combination of a corrugated panel and adhesive bonding of the flexible solar material, provides a very simple way of making potentially a very large panel. The panels can be formed using a conventional rolling process in order to create the corrugations and the flexible solar material can be bonded in place immediately downstream of the rolling assembly.

The ridges may have a flat top and the flexible solar material may be bonded to this flat top. However, preferably, the flexible solar material is attached to a curved face of the ridge such that the flexible solar material takes on a curved configuration. We have found that the curved solar material provides a more efficient collection of solar power than a flat panel of equivalent surface area.

The flexible solar material may be any flexible solar material such as amorphous silicon CdTe, CIGS, GaAs. However, preferably, it is a thin film organic photovoltaic (OPV) material. This is supplied on long rolls and is really suited to being unrolled and attached to the ridges of the roof panel. Prior art documents such as US2013/0061913, CN109383115 and CN203457102 disclose roof tiles with OPV material. However, this is deposited onto the tile which is not suitable for the large scale, low cost arrangement of the invention.

Preferably the ratio of the maximum width of a ridge to the maximum height is less than 2:1, and more preferable less than 1.5:1 wherein the width is maximum measurement in a widthwise direction across the ridge between the parts of the ridge where the sheet flattens out or turns back up. This provides a relatively tall/narrow ridge as compared to the prior art which has been found to be beneficial in allowing the solar material to be arranged so as to maintain a relatively uniform generation during the day.

The roof panel is likely, in practice, to be significantly larger than a conventional roof tile in particular, the length and width of the panel are preferably both in excess of 1 m. Further at least the length or the width of the panel is preferably greater than 5 m, preferably greater than 6 m, and preferably greater than 10 m.

Because the roof panels can be formed essentially using conventional techniques and take up the shape which resembles a conventional corrugated panel, the roof panels can be used in placed of many conventional ridged roof panels. This means that they can readily be used in place of existing roof systems.

The roof panels can incorporate any conventional feature of such a roof panel including lining and insulation.

Preferably, the sheet has through holes through which electrical connections from the solar material extend to the opposite side of the sheet. At least one inverter may be accommodated in a ridge on an underside of the panel and/or cabling may be formed in a ridge on an underside of the panel. This allows a near complete solar generating system to be integrated into the panel in a factory setting making it easy to install on a roof.

Although the ridges may be a similar size to those of a conventional roof panel, greater efficiency is provided by having panels which are significantly larger than traditional ones. Preferably, therefore, each ridge is wide enough that it can accommodate, along its length, a strip of flexible solar material which is at least 1 m wide.

The solar material on the panel may run continuously in a single strip along the ridge. However, preferably, there are a plurality of strips of the solar material arranged along each ridge.

The strips may be electrically connected to one another however, preferably, the strips are electrically isolated from one another and an electrical connection is provided to each strip. This allows the output from each strip to be monitored. In the event that the strip is faulty, this is detected and just that strip can be repaired or replaced. Thus, by dividing the simple solar material in this way, the fault with any particular strip does not have a significant effect on the total power output. If a fault does occur, this is easy to remedy without affecting the power output of the remaining strips.

The present invention also extends to a method of forming a roof panel according to claim 11.

When the solar material is adhered to the sheet, the electrical connections to the solar panel are aligned with the holes in the sheet which provides a simple assembly process. This allows just the solar material to be adhered to the upper face of the sheet while the rest of the generating system can be protected below the sheet in the ridges.

The method preferably further comprises attaching at least one inverter in a ridge on an underside of the panel.

The method preferably further comprises attaching cabling in a ridge on an underside of the panel.

The method preferably further comprises forming the panel before being transported to the site of the roof.

The method preferably further comprises forming a panel having any of the above mentioned dimensional limitations.

An example of a roof panel in accordance with the present invention will now be described with reference to the accompanying drawings, in which:

FIG. 1 is a side view of a roof comprising four roof panels according to the present invention;

FIG. 2 is a view similar to FIG. 1 showing only the end most panel;

Figure 3:
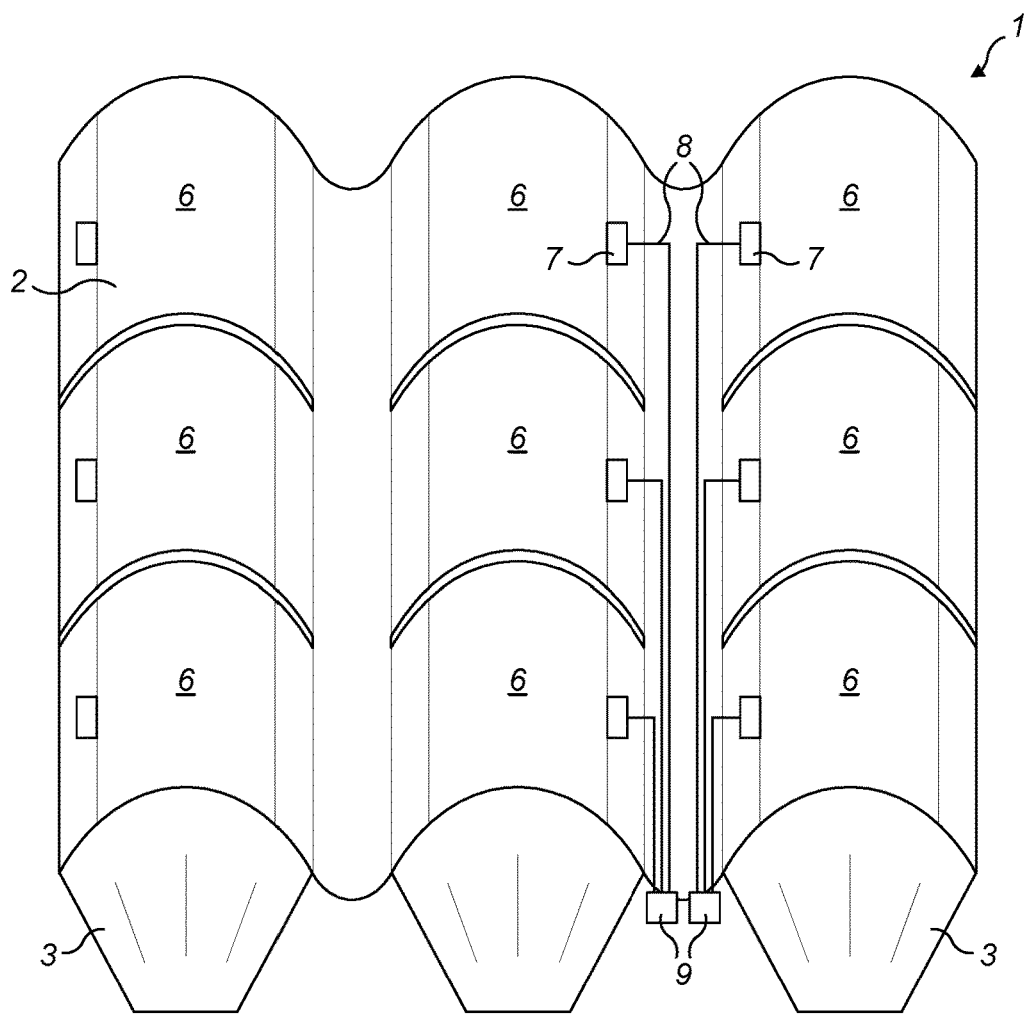
FIG. 3 is a perspective view from above of the panel of FIG. 2.
Figure 5:
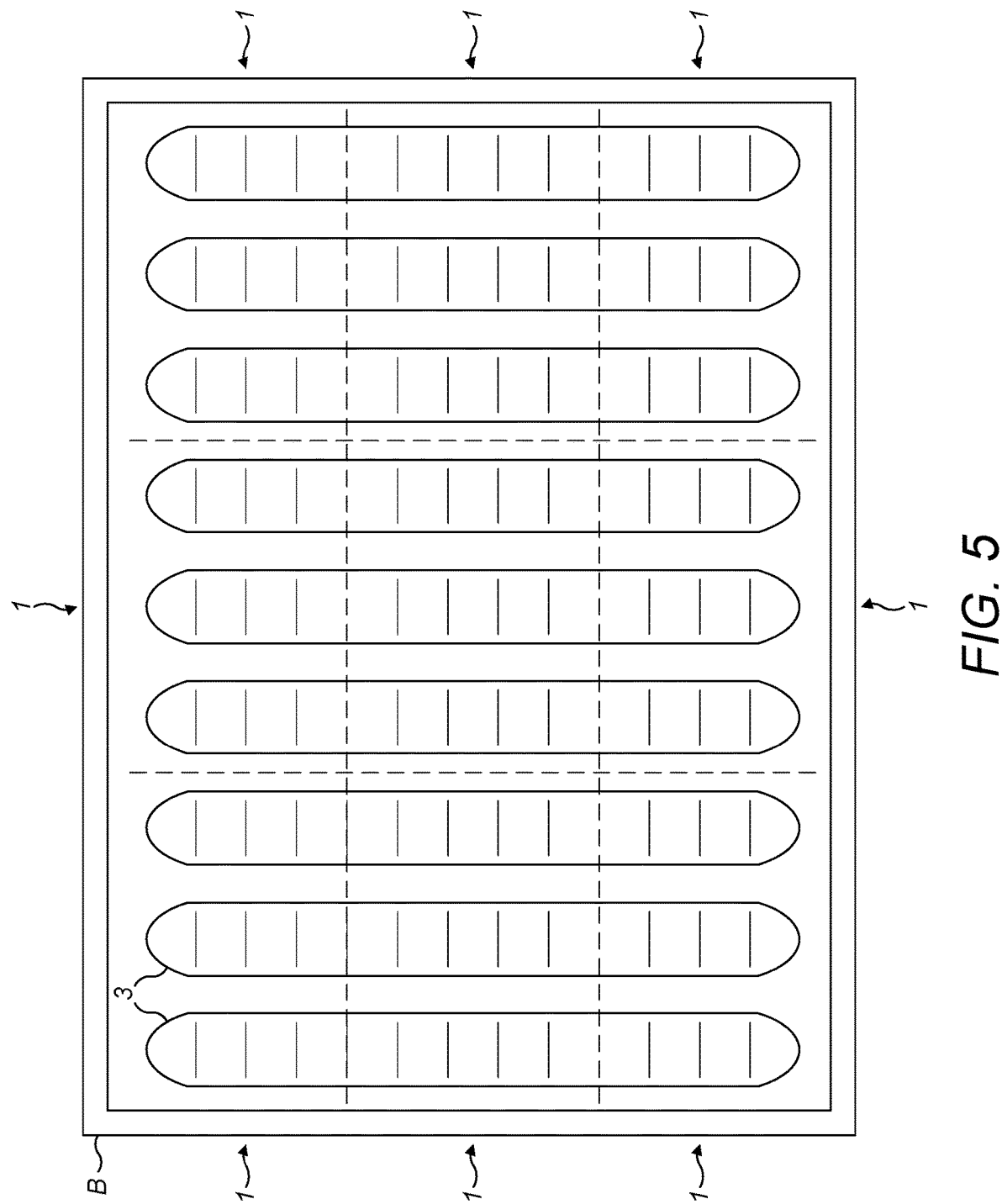
FIG. 5 is a plan view of a roof incorporating an array of panels.

The panel 1 illustrated in FIGS. 2 and 3 is approximately 8 m×8 m. In practice, each panel could be 100 m or more long and 10 m or more wide. The panel 1 comprises three ridges 2 which extend along most of the length of the panel. As FIG. 2 shows an end panel, there is, a shroud 3 provided at the end of each ridge to close the gap under each ridge at the end of the roof. As is apparent from FIGS. 1 and 5, the roof is made up of a number of panels 1 connected end to end. FIG. 1. Shows four panels end to end, while FIG. 5 shows three. In FIG. 1, there are two middle panels 4 which are devoid of the shroud 3 and two end panels 5 which are provided with the shrouds 3. As will be appreciated, any of the above dimensions, the number of ridges per panel and the number of panels forming a roof can be varied. As schematically shown in FIG. 5, a 3×3 array provides the complete roof for a building B.

Figure 4:
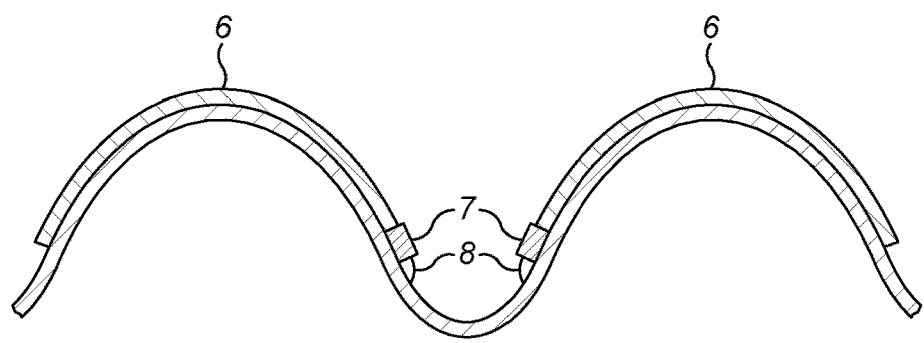
FIG. 4 is a cross-section through two of the ridges of one of the panels.

In order to form the panel 1, a flat sheet of metal such as aluminium or steel is fed through rollers in order to form the sinusoidal cross section in FIG. 4. Once this has been formed a number of strips 6 of flexible solar material are adhered to the ridges. The flexible solar material is preferably a thin form organic photovoltaic material. This is supplied on rolls and is therefore simple to unroll and adhere to the ridges as the panel leaves the rollers.

The solar material is attached as a number of separate strios 6 as is apparent from FIGS. 2 and 3. Each strip 6 has its own connector 7 and associated wiring 8 runs along the panel to a connection point 9 which effectively serves as the power output for the solar material on a particular ridge 2. The connectors 7 may extend through holes in the panel 1 such that the wiring is on the underside of the panel 1. This also allows monitoring of the output from each strip.

The panels can have a modular design such that the middle panels 4 are the same as the end panels 5 with the shrouds 3 being fixed separately to the end of panels for it to act as an end panel 5. The panels may have complementary connection points 10 so that when any two panels are connected end to end, the connections 9 for one panel connect to an electrical connection on an adjacent panel such that all of the wiring 8 ultimately leads to one end of the roof.

Figure 6:
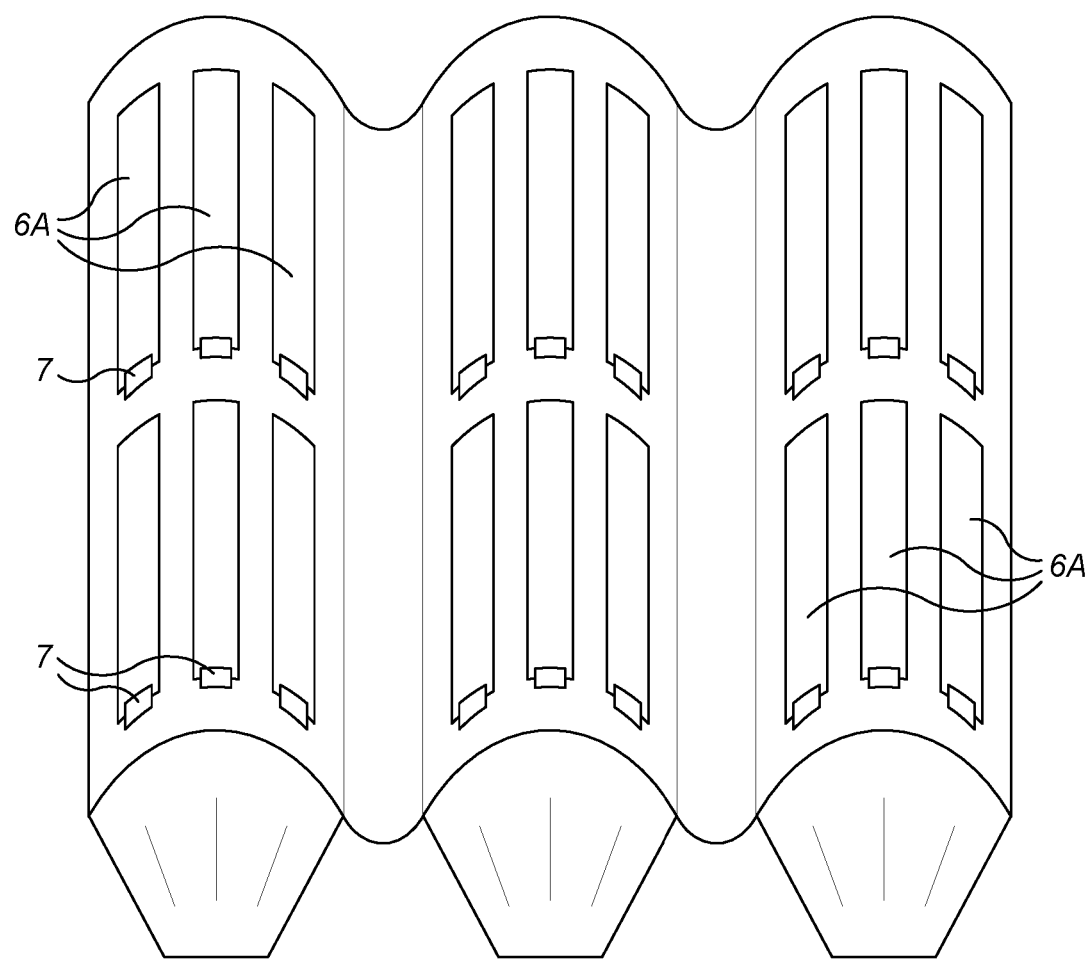
FIG. 6 is a view similar to FIG. 3 of a second example of the invention.

As show in FIG. 6, instead of being arranged along each ridge, the strips 6A could be larger and thinner and be arranged across each ridge as shown. In this case, the connectors 7 can be positioned at the end of each trip 6A and connected in an appropriate manner.

Figure 7:
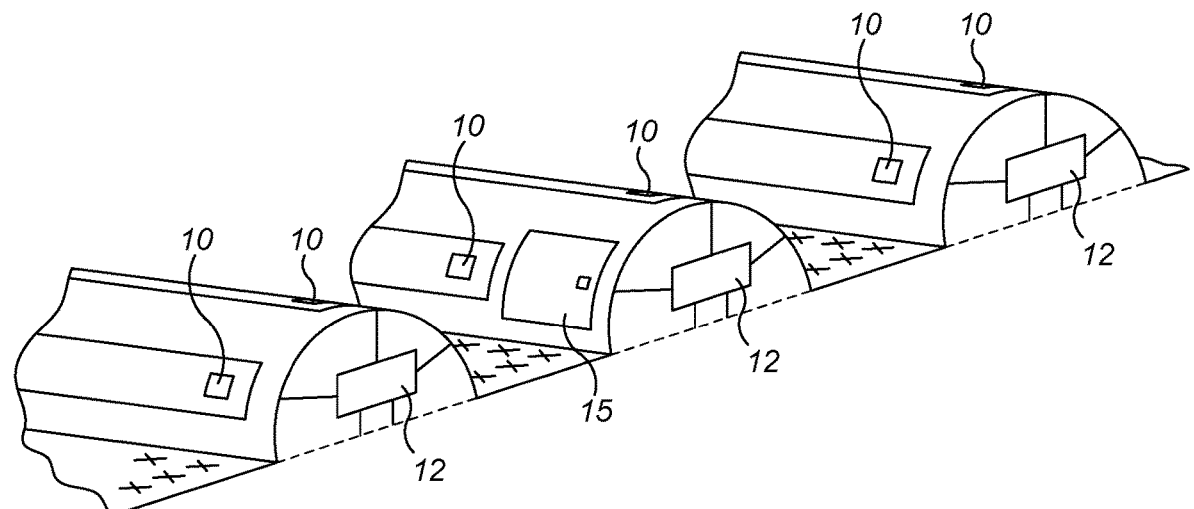
FIG. 7 is a schematic perspective view of a third example of part of a roof panel.
Figure 8:
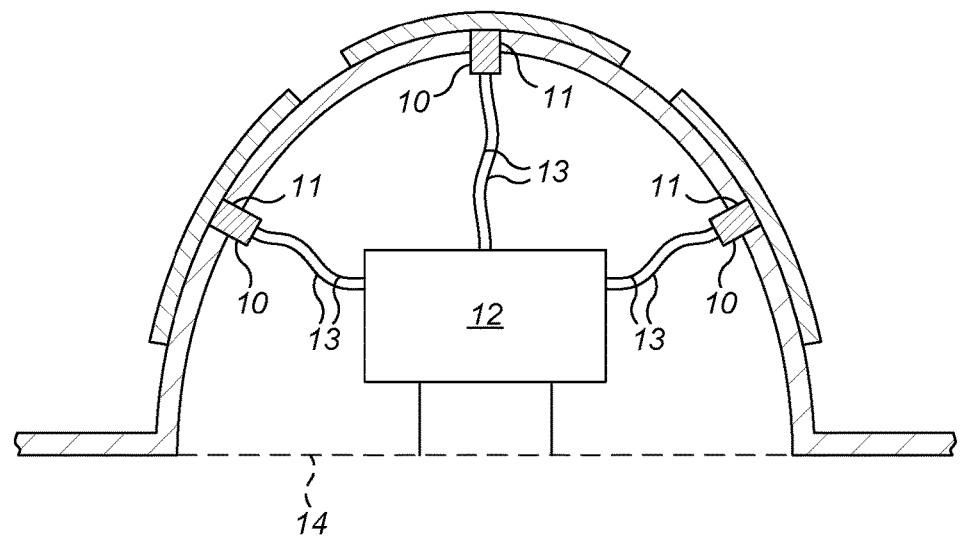
FIG. 8 is a schematic cross section of one ridge of the third example.

The example shown in FIGS. 7 and 8 shows a third example. In this case, each strip 6 has connector 10 on the surface facing the panel 1. In practice, this would not be visible in FIG. 7 as it is on the underside of the strips 6. However it is depicted here to show its position. The panel 1 has a corresponding through hole 11 for each connector 10. When each strip is presented to the panel 1, its connector 10 is aligned with the respective through hole 11. This provides a very simple way of making a connection to the strip and means that equipment required by the solar panels can be mounted under the panel 1 in a ridge where it is protected.

As shown in FIGS. 7 and 8, the ridges incorporate inverters 12 and associated cabling 13. Each ridge may have vents 14, in this case shown in a floor, to allow the circulation of air to the inverters. A door 15 (shown just in the middle ridge of FIG. 7) provides access to this equipment for maintenance.

The invention claimed is:

1. A roof panel comprising:
    a rigid sheet of material for forming a structural roof, the rigid sheet of material being formed with a plurality of ridges having alternating crests and troughs, and strips of flexible solar material attached along a plurality of the crests of the ridges, wherein the strips of flexible solar material does not extend across the troughs between adjacent ridges of the plurality of ridges;
    wherein the maximum height of at least one of the ridges above a lowermost plane of the rigid sheet of material is greater than 50 cm,
    wherein each ridge is wide enough that it can accommodate, along its length, one of the strips of flexible solar material which is at least 1m wide, and
    at least one inverter accommodated in one of the ridges on an underside of the roof panel.

2. A roof panel according to claim 1, wherein the flexible solar material is bonded to the rigid sheet of material using an adhesive.

3. A roof panel according to claim 1, wherein the rigid sheet of material is corrugated such that the ridges are an integral part of the rigid sheet of material.

4. A roof panel according to claim 1, where the flexible solar material is attached to a curved face of the respective ridge such that the flexible solar material takes on a curved configuration.

5. A roof panel according to claim 1, wherein the flexible solar material is a thin film organic photovoltaic material.

6. A roof panel according to claim 1, wherein the length and width of the roof panel are both in excess of 1 m.

7. A roof panel according to claim 1, wherein at least the length or the width of the roof panel is greater than 6 m.

8. A roof panel according to claim 1, wherein the ratio of the maximum width of each ridge to the maximum height is less than 2:1, wherein the width is maximum measurement in a widthwise direction across each ridge between the parts of each ridge where the rigid sheet of material flattens out or turns back up.

9. A roof panel according to claim 1, wherein there are a plurality of strips of the flexible solar material arranged along each ridge.

10. A roof panel according to claim 9, wherein the strips of the flexible solar material are electrically isolated from one another and an electrical connection is provided to each strip of the flexible solar material.

11. A roof panel according to claim 1, wherein the rigid sheet of material has through holes through which electrical connections from the flexible solar material extend to the opposite side of the rigid sheet of material.

12. A roof panel according to claim 1, further comprising cabling formed in at least one of the ridges on an underside of the roof panel.

* * * * *